United States Patent
Sherry et al.

(10) Patent No.: US 10,910,004 B2
(45) Date of Patent: Feb. 2, 2021

(54) DISK DRIVE SUSPENSION BASEPLATE HAVING ENHANCED TORQUE RETENTION AND METHOD OF MANUFACTURE

(71) Applicant: MMI Technologies Pte Ltd., Singapore (SG)

(72) Inventors: James J. Sherry, Maple Grove, MN (US); Shawn P. Bopp, Savage, MN (US); Craig A. Leabch, Saint Cloud, MN (US); Jeffery D. Weckwerth, Dassel, MN (US); Stephen J. Hansen, Dassel, MN (US); Douglas P. Riemer, Waconia, MN (US)

(73) Assignee: MMI TECHNOLOGIES PTE LTD., Singapore (SG)

(*) Notice: Subject to any disclaimer, the term of this patent is extended or adjusted under 35 U.S.C. 154(b) by 320 days.

(21) Appl. No.: 15/691,627

(22) Filed: Aug. 30, 2017

(65) Prior Publication Data

US 2018/0068684 A1 Mar. 8, 2018

Related U.S. Application Data

(60) Provisional application No. 62/383,053, filed on Sep. 2, 2016.

(51) Int. Cl.
*G11B 5/48* (2006.01)
*C23G 1/08* (2006.01)
*C23F 1/28* (2006.01)
*C23C 22/50* (2006.01)
*C23F 1/16* (2006.01)

(52) U.S. Cl.
CPC ............ *G11B 5/4833* (2013.01); *C23C 22/50* (2013.01); *C23F 1/16* (2013.01); *C23F 1/28* (2013.01); *C23G 1/085* (2013.01)

(58) Field of Classification Search
CPC .................................................... G11B 5/4833
See application file for complete search history.

(56) References Cited

U.S. PATENT DOCUMENTS

| 8,339,745 B2 | 12/2012 | Yabu et al. | |
| 2003/0156357 A1* | 8/2003 | Brink | G11B 5/4813 360/244.6 |
| 2013/0074992 A1* | 3/2013 | Kawatake | C23C 8/14 148/287 |
| 2014/0061510 A1* | 3/2014 | Twitchen | C30B 29/04 250/492.1 |

OTHER PUBLICATIONS

"Roughness (2D) parameter." Olympus, Dec. 7, 2016, https://www.olympus-ims.com/fr/knowledge/metrology/roughness/2d_parameter/. Accessed May 7, 2019. (Year: 2016).*

* cited by examiner

*Primary Examiner* — Laura A Auer

(57) ABSTRACT

Disk drive suspension baseplates made of a base metal and methods for manufacturing disk drive suspension baseplates having boss outer surfaces characterized by roughness parameters $R_a \geq 0.15$ μm.

15 Claims, 5 Drawing Sheets

DISK DRIVE SUSPENSION BASEPLATE HAVING ENHANCED TORQUE RETENTION AND METHOD OF MANUFACTURE

CROSS-REFERENCE TO RELATED APPLICATIONS

This application claims priority from U.S. Provisional Patent Application No. 62/383,053, filed on Sep. 2, 2016, which is hereby incorporated by reference in its entirety.

FIELD

The invention relates to baseplates of the type incorporated into disk drive suspensions, and methods for manufacturing such baseplates.

BACKGROUND

Disk drive suspension baseplates and methods for manufacturing the baseplates are disclosed in the Yabu et al. U.S. Pat. No. 8,339,745 which is incorporated herein by reference in its entirety and for all purposes. As described in the Yabu et al. patent, baseplates are attached (e.g., by welding) to the proximal end portions of the suspensions and have tubular bosses or boss towers. As described in the Yabu et al. patent and in Brink, U.S. Pub. 2003/0156357, baseplates are commonly manufactured by stamping a base metal such as stainless steel. The base metal baseplate may then be subjected to various chemical polishing or etching processes. The Yabu et al. patent teaches immersion of the stainless steel baseplate in a chemical solution to polish the inner circumference wall of the ball insertion hole in the press-formed boss portion of the baseplate. The suspension is attached to an actuator arm of the disk drive by a swaging process. During the swaging process the boss is located in an opening in the actuator arm, and a ball is forced through the boss to deform the boss and engage the outer surface of the boss (sometimes known as the outer diameter or OD) with the inner surface of the actuator arm opening. The strength of the mechanical connection between the boss and actuator arm is characterized by a property and measurement known as torque retention. Torque retention is affected by the normal force between the baseplate and the actuator arm after swage, the amount of area in contact after swage, and the static coefficient of friction between these two surfaces. The static coefficient of friction can be improved by changing the surface roughness of the baseplate.

SUMMARY

Brink et al. describes a method of making a swage mount for a disk drive suspension assembly. The swage mount is made of a stainless steel base metal. It has a flat flange and a cylindrical boss or hub. The outer surface of the hub portion of the swage mount is plated with a thin layer of a softer plating metal to improve torque retention between the baseplate and the actuator arm. There still remains a considerable continuing need for improved baseplates and methods of manufacture.

Disk drive suspension baseplates made of base metal and methods for manufacturing disk drive suspension baseplates having boss outer surfaces characterized by roughness parameters $R_a \geq 0.15$ nm are described.

Other features and advantages of preferred embodiments of the present invention will be apparent from the accompanying drawings and the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
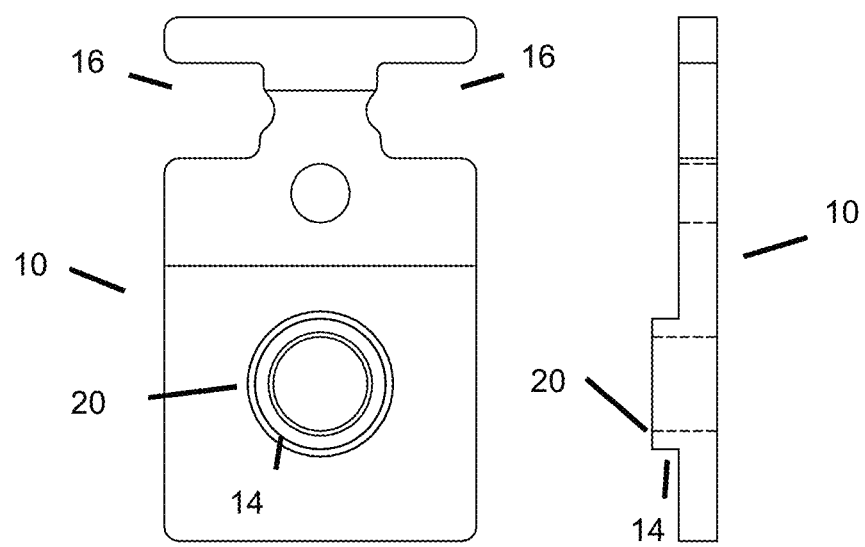
FIG. 1 illustrates a baseplate including a boss according to an embodiment.
Figure 2:
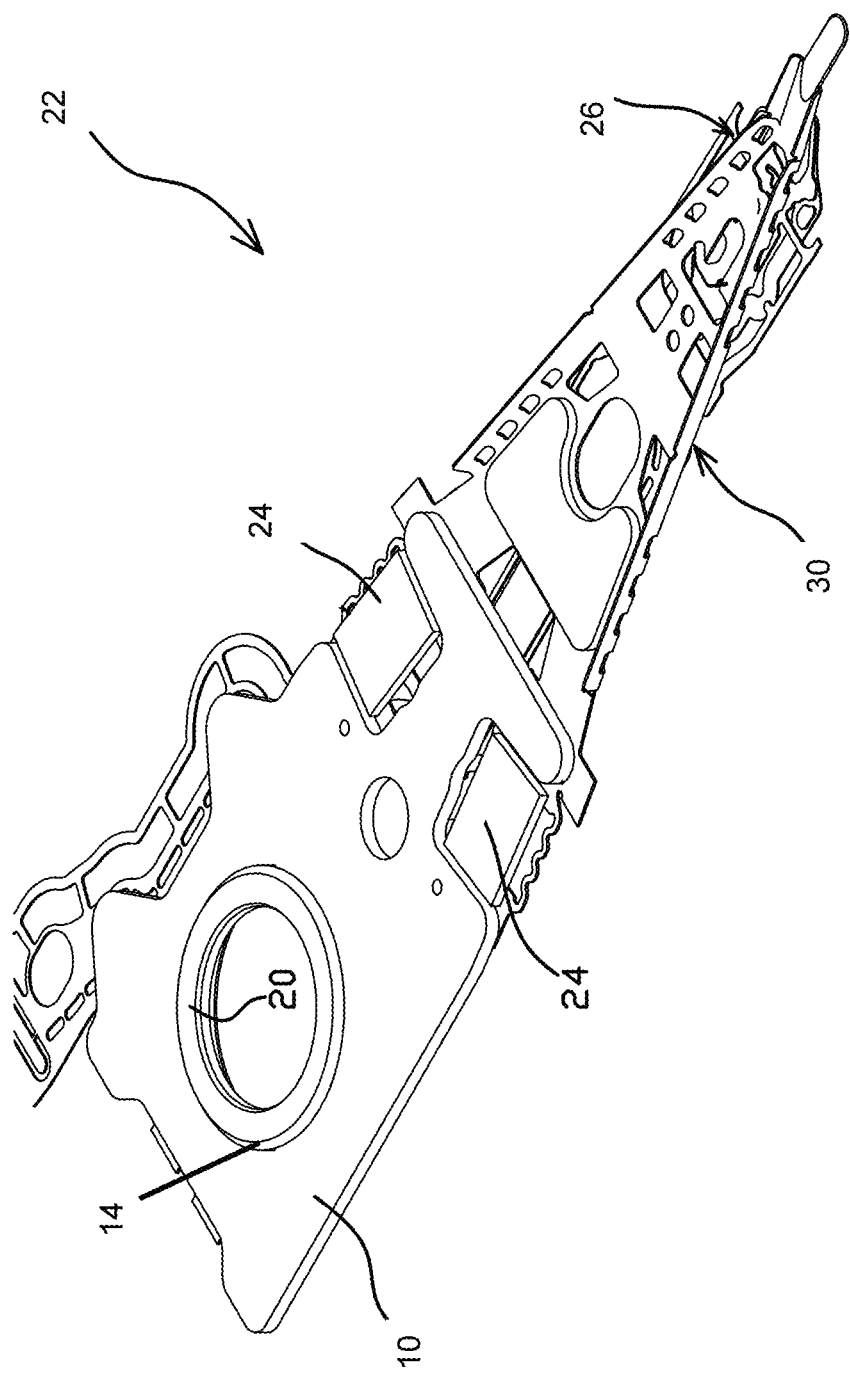
FIG. 2 illustrates a baseplate including a boss according to embodiment as part of a dual-stage actuation suspension assembly.
Figure 3:
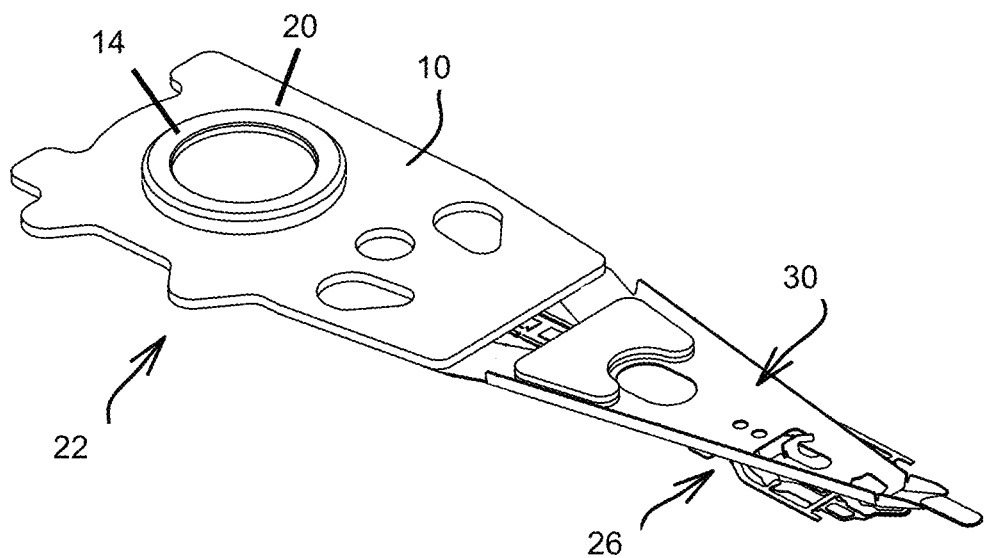
FIG. 3 illustrates a baseplate including a boss according to an embodiment as part of a suspension assembly.

Embodiments of the invention include lower swage force baseplates having boss surface roughness characteristics that provide enhanced torque retention, and methods for manufacturing the baseplates. Current baseplates have boss outer surfaces characterized, for example, by roughness parameters: $R_a$, which is typically 0.04 µm to 0.14 µm; $R_q$, which is typically 0.07 µm to 0.18 µm; and H, which is typically 0.16 µm to 0.50 µm. FIG. 1 illustrates a typical base metal baseplate 10 including a formed boss 20. As illustrated, the baseplate 10 includes openings 16 for motors, such as a piezoelectric motor. FIG. 2 illustrates a base metal baseplate 10 including a boss 20 as part of a dual-stage actuator suspension assembly. The suspension assembly 22 includes motors 24, a load beam 30, and a gimbaled flexure 26. FIG. 3 illustrates a base metal baseplate 10 including a boss 20 as part of a suspension assembly 22 including a load beam 30 and a gimbaled flexure 26. The gimbaled flexure 26 may include one or two motors mounted on the gimbaled flexure 26.

Baseplates 10, according to the present invention, as explained hereinafter, are made from a stainless steel base metal and have a boss 20 with an outer surface 14. The baseplate 10 and boss 20 formed from a base metal like stainless steel is passivated by insertion in an acid bath and then chemically etched, resulting in a boss outer surface 14 having a roughness parameter $R_a \geq 0.15$ µm, for example. $R_a$ is commonly known as an arithmetical mean deviation of a surface roughness profile. The process can also produce a boss outer surface 14 characterized by roughness parameters $R_a \geq 0.20$ µm. Yet other embodiments may have boss outer surfaces 14 characterized by roughness parameters $R_a \geq 0.25$ µm, including 0.40 µm. Boss outer surfaces 14 in accordance with the embodiments of the present invention can be characterized by roughness parameters $R_a \geq 0.70$ µm.

The preferred embodiments of baseplates 10 of the present invention have a boss 20 with outer surfaces 14 that are characterized by roughness parameters $R_q \geq 0.2$ µm. $R_q$ is commonly known as a root-mean-square roughness. Other embodiments have boss outer surfaces 14 characterized by roughness parameters $R_q \geq 0.3$ µm. Yet other embodiments have boss outer surfaces 14 characterized by roughness parameters $R_q \geq 0.5$ µm, including 0.7 µm. Boss outer surfaces 14 in accordance with embodiments can be characterized by roughness parameters $R_q \geq 0.7$ μin. Measurements of these surface roughness characteristics, $R_a$ and $R_q$, for example, can be made using instruments such as a white laser interferometer made by Olympus IMS or Zygo®.

In preferred embodiments, baseplates 10 have boss outer surfaces 14 characterized by roughness parameters H≥0.5 H is commonly known as Swedish height. Other embodiments have boss outer surfaces 14 characterized by roughness parameters H≥0.6 μm. Yet other embodiments have boss outer surfaces 14 characterized by roughness parameters H≥0.8 μm, including 1.4 μm. Boss outer surfaces 14 in accordance with embodiments can be characterized by roughness parameters H≥2.0 μm. Measurements of these surface roughness characteristics, for example, can be performed using instruments such as a white laser interferometer.

Figure 4:
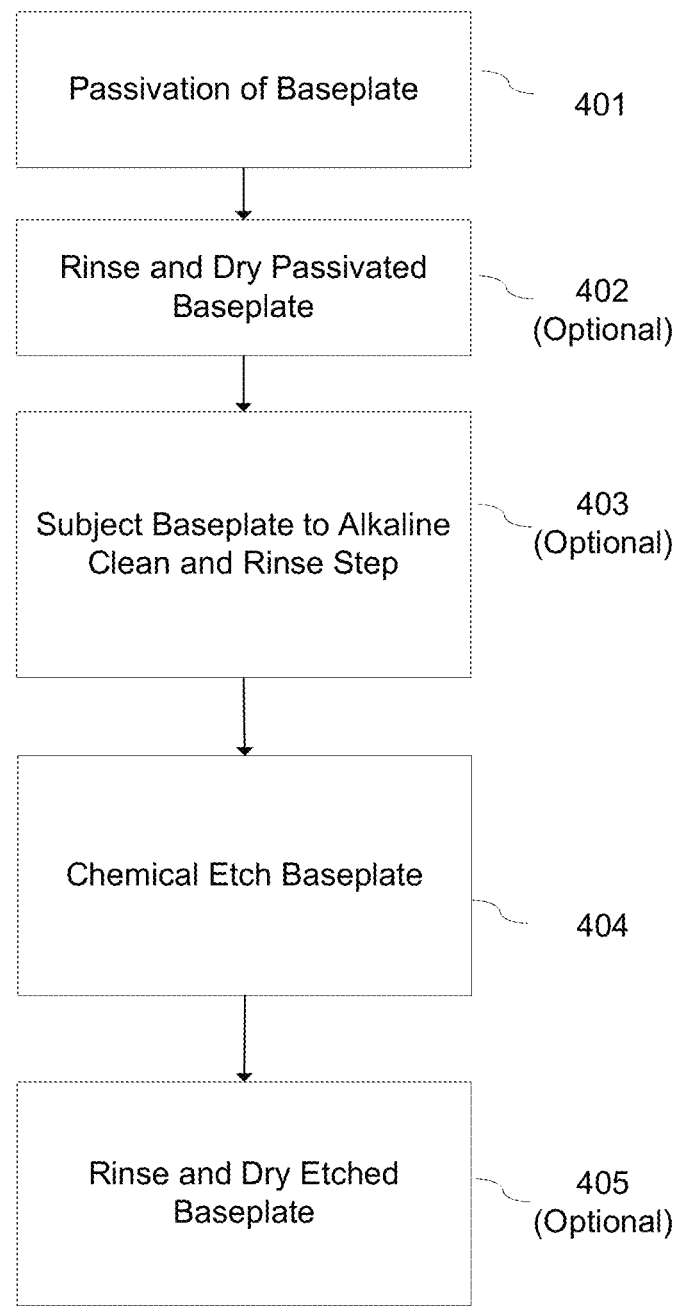
FIG. 4 illustrates a flow chart of a process for manufacturing baseplates to have a surface characterized by roughness according to an embodiment.

The preferred embodiments of the baseplates of the present invention having surface roughness characteristics providing enhanced torque retention can be manufactured by a multi-step (e.g. two-step) process including passivation of the baseplate (including the boss outer surface) (401), followed by a chemical etch (404) as illustrated in FIG. 4. The passivated baseplates can be rinsed (e.g., using deionized water) and dried before the chemical etch step (402). Following the passivation (401), and any rinse and dry steps (402), and before the chemical etch step (404), the baseplates can be subjected to alkaline clean and rinse steps (403). The baseplates can also be rinsed and dried following the chemical etch step (405).

Preferably the passivation is performed by exposing the baseplates to a bath of acid such as citric or nitric acid. The citric acid passivation preferably includes exposing the baseplates to a bath of citric acid having (1) a concentration of 3%-15% (w/w), (2) at a temperature of 70°-200° F., and (3) for an immersion time of 10-120 minutes. Another preferred embodiment of citric acid passivation includes exposing the baseplates to a bath of citric acid having (1) a concentration of 8%-12% (w/w), (2) at a temperature of 160°-180° F., and (3) for an immersion time of 20-75 minutes. A preferred embodiment of nitric acid passivation includes exposing the baseplates to a bath of nitric acid having (1) a concentration of 15%-70% (v/v), (2) at a temperature of 100°-200° F., and (3) for an immersion time of 10-60 minutes. Another preferred embodiment of nitric acid passivation includes exposing the baseplates to a bath of nitric acid having (1) a concentration of 40%-60% (v/v), (2) at a temperature of 160°-180° F., and (3) for an immersion time of 20-75 minutes. The acid used in these embodiments can include other additives such as accelerants, inhibitors, and/or solutions capable of producing parts that pass specified test requirements for passivation (e.g., per 7.1.1.5 of ASTM standard A967) to enhance passivation and cleaning.

The chemical etch following passivation is performed by methods described in the above-identified and incorporated Yabu et al. patent. For example, a preferred embodiment of the chemical etch includes exposing the baseplates to a bath component including (1) 0%-50% (w/w) hydrochloric acid, (2) 0%-50% (w/w) nitric acid, (3) 0%-50% (w/w) phosphoric acid, (4) 0-20 g/l iron (Fe+3 and Fe+2), and (5) 0%-10% surfactant, inhibitor, leveler and stabilizer. Another preferred embodiment of the chemical etch includes exposing the baseplates to a bath component including (1) 1%-10% (w/w) hydrochloric acid, (2) 1%-10% (w/w) nitric acid, (3) 10%-30% (w/w) phosphoric acid, (4) 6-15 g/l iron (Fe+3 and Fe+2), and (5) 0.1%-5% surfactant, inhibitor, leveler and stabilizer.

Another preferred embodiment for making baseplates having surface roughness characteristics according to the present invention that provide enhanced torque retention can be manufactured by performing chemical etch steps of the type described above two or more times. The baseplates can be subjected to rinse and dry steps, and/or to alkaline clean and rinse steps, before one or more of the chemical etch steps.

Figure 5:
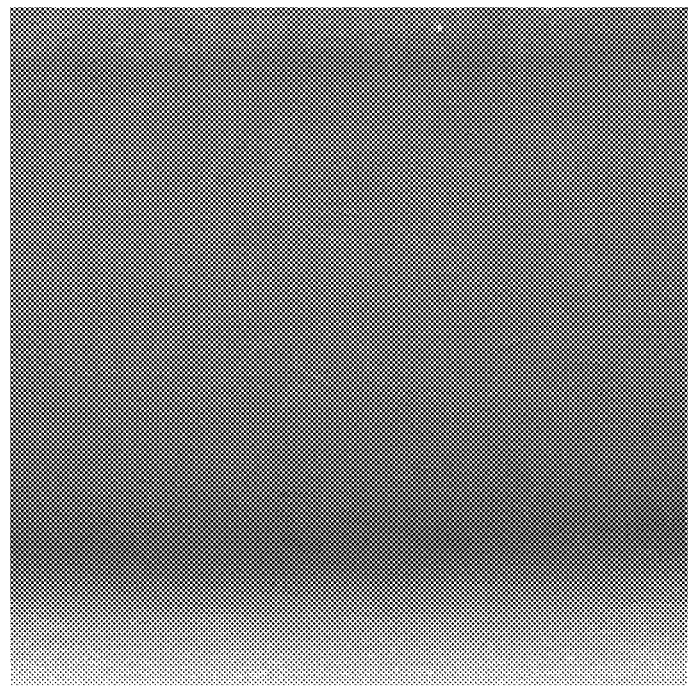
FIG. 5 illustrates a boss outer surface not using the process for manufacturing baseplates as describe herein.
Figure 6:
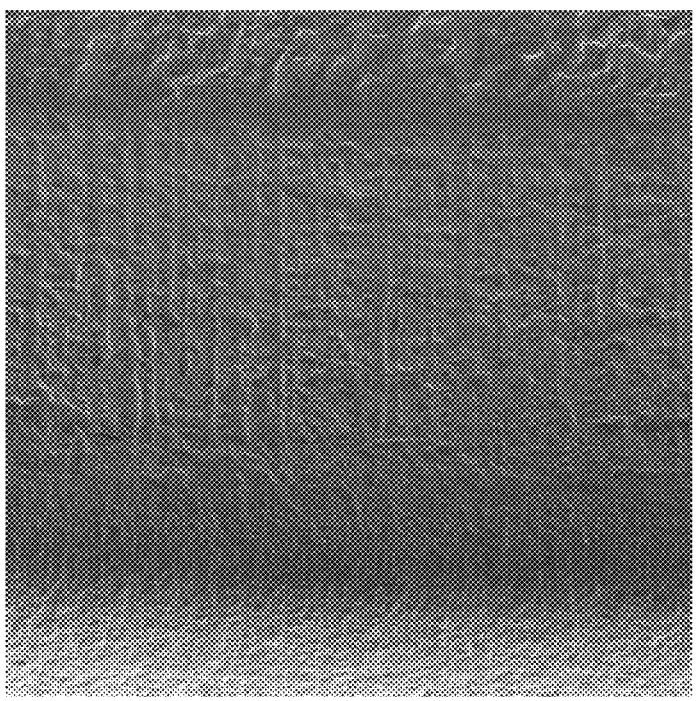
FIG. 6 illustrates a boss outer surface manufactured using a process for manufacturing baseplates to have a surface characterized by roughness according to an embodiment.

FIG. 5 illustrates a boss outer surface not using the process for manufacturing baseplates as described herein. FIG. 6 illustrates a boss outer surface manufactured using a process for manufacturing baseplates according to embodiments described herein, such as being subjected to the passivation and chemical etch methods described herein. As illustrated, the boss outer surface illustrated in FIG. 6 has a rougher surface than the boss outer surface illustrated in FIG. 5.

Baseplates having surface roughness characteristics in accordance with embodiments of the invention offer significant advantages. For example, they provide improved torque retention when swaged to a drive actuator arm. Tests of baseplates manufactured in accordance with embodiments of the invention have demonstrated significant torque retention increases (e.g., from about 10 oz.-in. for prior art processes to about 15 oz.-in. for the present invention). Additional torque retention without changing the design allows the swaging process to be modified to its advantage. For example, a smaller swage ball can be used to swage the baseplate manufactured with the above-described manufacturing methods. Thus, a lower swage force baseplate results using the manufacturing methods described herein. While still achieving satisfactory torque, the smaller ball will lead to fewer detrimental effects such as warping of the flange portion of the baseplate during the swaging process. This in turn results in less change to the gram load, or vertical placement of the read-write head relative to the disk. A baseplate manufactured according to the above-described methods can be designed with a smaller boss height, allowing thinner actuator arms, which allows closer spacing of the disks, leading to a smaller overall drive height. The above-described baseplate manufacturing methods are efficient, repeatable and effective.

Although the invention has been described with reference to preferred embodiments, those of skill in the art will recognize that changes can be made in form and detail without departing from the spirit and scope of the invention. For example, other chemical methods involving other chemical etchants, polishes, pickling solutions in single process can be employed to create the surface roughness desired on the outer surface of the boss. In addition, other methods such as those involving thermal (e.g., heat treating), electrochemical (e.g., anodic current flow in combination with a chemical solution) and mechanical (e.g., shot peen or tumbling with media) can also be used to manufacture baseplates in accordance with embodiments of the present invention.

What is claimed is:

1. A disk drive suspension baseplate made from a base metal, comprising: a boss made of the base metal extending from the baseplate, the boss outer surface having roughness parameters $R_a \geq 0.15$ μm.

2. The disk drive suspension baseplate of claim 1 wherein the boss outer surface has roughness parameters $R_a \geq 0.20$ μm.

3. The disk drive suspension baseplate of claim 1 wherein the boss outer surface has roughness $R_a \geq 0.25$ μm.

4. The disk drive suspension baseplate of claim 3 wherein the boss outer surface has a roughness parameter of 0.40 μm.

5. The disk drive suspension baseplate of claim 1 wherein the boss outer surface has roughness parameters $R_a \geq 0.70$ μm.

6. A disk drive suspension baseplate made from a base metal comprising: a boss made of the base metal extending from the baseplate, the boss outer surface having roughness parameters $R_q \geq 0.2$ μm.

7. The disk drive suspension baseplate of claim 6 wherein the boss outer surface has roughness parameters $R_q \geq 0.3$ μm.

8. The disk drive suspension baseplate of claim 6 wherein the boss outer surface has roughness parameters $R_q \geq 0.5$ μm.

9. The disk drive suspension baseplate of claim 8 wherein the boss outer surface has a roughness parameter of 0.70 μm.

10. The disk drive suspension baseplate of claim 6 wherein the boss outer surface has roughness parameters $R_q \geq 0.7$ μm.

11. A disk drive suspension baseplate made from a base metal comprising: a boss outer made of the base metal extending from the baseplate, the boss outer surface having roughness parameters $H \geq 0.5$ μm.

12. The disk drive suspension baseplate of claim 11 wherein the boss outer surface has roughness parameters $H \geq 0.6$ μm.

13. The disk drive suspension baseplate of claim 11 wherein the boss outer surface has roughness parameters $H \geq 0.8$ μm.

14. The disk drive suspension baseplate of claim 13 wherein the boss outer surface has a roughness parameter of 1.4 μm.

15. The disk drive suspension baseplate of claim 11 wherein the boss outer surface has roughness parameters $H \geq 2.0$ μm.

* * * * *